US009060300B2

(12) United States Patent
Lee et al.

(10) Patent No.: US 9,060,300 B2
(45) Date of Patent: Jun. 16, 2015

(54) METHOD AND APPARATUS FOR EFFICIENTLY RECEIVING BROADCAST CONTROL MESSAGE USING MAC PDU HEADER IN WIRELESS ACCESS SYSTEM

(75) Inventors: Eunjong Lee, Anyang-si (KR); Kiseon Ryu, Anyang-si (KR); Youngsoo Yuk, Anyang-si (KR); Giwon Park, Anyang-si (KR); Jinsam Kwak, Anyang-si (KR); Yongho Kim, Anyang-si (KR); Jeongki Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 13/509,238

(22) PCT Filed: Nov. 10, 2010

(86) PCT No.: PCT/KR2010/007921
§ 371 (c)(1),
(2), (4) Date: May 10, 2012

(87) PCT Pub. No.: WO2011/059231
PCT Pub. Date: May 19, 2011

(65) Prior Publication Data
US 2012/0230243 A1  Sep. 13, 2012

Related U.S. Application Data

(60) Provisional application No. 61/259,647, filed on Nov. 10, 2009.

(30) Foreign Application Priority Data

Nov. 10, 2010 (KR) ........................ 10-2010-0111244

(51) Int. Cl.
H04W 28/06 (2009.01)
H04W 4/06 (2009.01)
H04W 48/12 (2009.01)

(52) U.S. Cl.
CPC ................ *H04W 28/06* (2013.01); *H04W 4/06* (2013.01); *H04W 48/12* (2013.01)

(58) Field of Classification Search
USPC .................. 370/312, 328, 349, 432; 455/500
See application file for complete search history.

(56) References Cited

U.S. PATENT DOCUMENTS

| 2002/0122411 | A1* | 9/2002 | Zimmerman et al. | 370/349 |
| 2007/0041378 | A1* | 2/2007 | Ihm et al. | 370/389 |
| 2009/0268700 | A1* | 10/2009 | Son et al. | 370/336 |
| 2010/0188965 | A1* | 7/2010 | Cheng et al. | 370/203 |
| 2011/0010610 | A1* | 1/2011 | Boariu et al. | 714/807 |
| 2011/0206027 | A1* | 8/2011 | Hart et al. | 370/338 |

FOREIGN PATENT DOCUMENTS

| KR | 10-2008-0043042 | 5/2008 |
| KR | 10-2008-0106089 | 12/2008 |

OTHER PUBLICATIONS

Son et al. ; Proposal of the Broadcast A-MAP IE for Concurrent transmission of the Broadcast management messages. IEEE 802.16 Broadband Wireless Access Working Group. Jul. 6, 2009.*
LG Electronics, "Proposed Text on Transmission of Broadcast MAC Control Messages (15.2.4.7)", IEEE 802.16 Broadband Wireless Access Working Group, IEEE C802.16m-09/2587r1, Nov. 2009.
Samsung Electronics Co., Ltd, "Transmission for Broadcast Management Message (15.3.6.5.4.1)", IEEE 802.16 Broadband Wireless Access Working Group, IEEE C802.16m-09/1983, Aug. 2009.

* cited by examiner

*Primary Examiner* — Edan Orgad
*Assistant Examiner* — Saumit Shah
(74) *Attorney, Agent, or Firm* — Lee, Hong, Degerman, Kang & Waimey

(57) ABSTRACT

Disclosed is a method of driving a terminal for receiving a broadcast control message formed of a MAC PDU from a wireless access system. The method includes receiving at least one broadcast control message from a base station in a resource region where a broadcast control message is transmitted, extracting broadcast control message type information that represents the kind of a broadcast control message included in the header of the received broadcast control message, and checking the extracted broadcast control message type information and determining whether payload of the received broadcast message is decoded.

9 Claims, 5 Drawing Sheets

* GMH: GENERIC MAC HEADER
* MH: MULTIPLEXING HEADER
* PN: PACKET NUMBER
* SH: SUBHEADER
* SDU: SERVICE DATA UNIT
* ICV: INTEGRITY CHECK VALUE ic # METHOD AND APPARATUS FOR EFFICIENTLY RECEIVING BROADCAST CONTROL MESSAGE USING MAC PDU HEADER IN WIRELESS ACCESS SYSTEM

CROSS-REFERENCE TO RELATED APPLICATIONS

This application is the National Stage filing under 35 U.S.C. 371 of International Application No. PCT/KR2010/007921, filed on Nov. 10, 2010, which claims the benefit of earlier filing date and right of priority to Korean Application No. 10-2010-0111244, filed on Nov. 10, 2010, and also claims the benefit of U.S. Provisional Application Ser. No. 61/259,647, filed on Nov. 10, 2009, the contents of which are all incorporated by reference herein in their entirety.

TECHNICAL FIELD

The present invention relates to a method of receiving a broadcast control message from a wireless access system and an apparatus therefor, and particularly, to a method of effectively receiving a broadcast message using the header of a medium access control packet data unit (MAC PDU) and an apparatus therefor.

BACKGROUND ART

A communication system based on the Internet consists of a protocol stack generally formed of five layers. The structure of the protocol stack is as illustrated in FIG. 1.

FIG. 1 is a view illustrating an example of a commonly used Internet protocol stack.

Referring to FIG. 1, the uppermost layer of the protocol stack is an application layer for supporting a network application such as file transfer protocol (FTP), a hypertext transfer protocol (HTTP), a simple mail transfer protocol (SMTP), and a real-time transport protocol (RTP). Next, there exist a transport layer for performing data transmission between hosts using a transmission control protocol (TCP) and a user datagram protocol (UDP) and a network layer for setting a path through data is transmitted from source to destination by an IP protocol. In addition, the protocol stack consists of a link layer for performing data transmission between peripheral networks and medium access control (MAC) through a PPP/Ethernet protocol and a physical layer that is the lowermost layer for transmitting data in units of bits using wired media or wireless media.

FIG. 2 is a view illustrating the operations of the respective layers for transmitting commonly used data.

Referring to FIG. 2, the transport layer of a transmitting part adds header information to a message payload received from the application layer that is an upper layer to generate a new data unit. The transport layer transmits the generated data unit to the network layer that is a lower layer. The network layer adds the header information used by the network layer to the data received from the transport layer to generate a new data unit and transmits the generated data unit to the link layer that is a lower layer. The link layer adds the header information used by the link layer to the data received from an upper layer to generate a new data unit and transmits the generated data unit to the physical layer that is a lower layer. The physical layer transmits the data unit received from the link layer to a receiving part.

The physical layer of the receiving part receives a data unit from the transmitting part to transmit the received data unit to the link layer that is the upper layer of the physical layer. The receiving part processes the headers added to the respective layers and transmits the message payload obtained by removing the headers to the upper layer. Data transmission and reception between the transmitting part and the receiving part are performed through the above processes.

In order to perform data transmission and reception between the transmitting part and the receiving part as illustrated in FIG. 2, the respective layers add protocol headers to perform control functions such as data addressing, routing, forwarding, and data re-transmission.

FIG. 3 illustrates a protocol layer model defined by a wireless mobile communication system based on the commonly used institute of electrical and electronics engineers (IEEE) 802.16 system.

Referring to FIG. 3, a MAC layer that belongs to the link layer may consist of three sub layers. First, a service-specific convergence sub layer (CS) may transform or map the data of an external network that is received through a CS service access point (SAP) to the MAC service data units (SDU) of a MAC common part sub layer (CPS). This layer may distinguish the SDUs of the external network from each other and then, may relate a corresponding MAC service flow identifier (SFID) to a connection identifier (CID).

Then, the MAC CPS as a layer for providing the core functions of the MAC such as system access, bandwidth assignment, and connection set and management receives data classified by specific MAC connection from various CSs through a MAC SAP.

At this time, quality of service (QoS) may be applied to data transmission and scheduling through the physical layer.

In addition, a security sub layer may provide authentication, security key exchange, and encoding functions.

The MAC layer is realized by concept of transport connection as a connection-oriented service. When a terminal is registered in a system, service flow may be defined by a negotiation between the terminal and the system.

When service request is changed, new connection may be set. Here, the transport connection defines mapping between peer convergence processes that use the MAC and the service flow and the service flow defines the QoS parameters of the MAC PDU exchanged in corresponding connection.

The service flow in the transport connection performs the core functions in operating the MAC protocol and provides mechanism for managing the QoS of an upward link and a downward link. In particular, service flows may be combined with processes of assigning bandwidth.

In the common IEEE 802.16 system, a terminal may have a universal MAC address having the length of 48 bits in each wireless interface. The address may be used for uniquely defining the wireless interface of the terminal and for setting the access of the terminal in an initial ranging process. Since a base station verifies terminals by different identifiers (ID), the universal MAC address may be used as a part of an authentication process.

The respective connections may be distinguished from each other by a connection identifier (CID) having the length of 16 bits. While the initialization of the terminal is performed, two pairs of management connections (an upward link and a downward link) are set between the terminal and the base station and three pairs may be selectively used including the management connection.

FIG. 4 illustrates processes of a common wireless access system generating MAC PDUs for a plurality of MAC SDUs.

Referring to FIG. 4, it is assumed that MAC SDUs for a number of, for example, three different flow connections for one terminal are transmitted. At this time, in order to generate a medium access control packet data unit (MAC PDU), the base station or the terminal may use different generic MAC headers (GMH) for the respective connections In the case where there exist MAC SDUs for different three connections, when the GMHs are attached to the MAC SDUs, three MAC PDUs may be formed. In the case of a connection in which security association (SA) is activated, security information items on corresponding MAC PDUs may be included in the respective MAC PDUs. At this time, the security information on the MAC PDU may consist of a pair of packet numbers (PN) and integrity check values (ICV).

FIG. 5 illustrates the format of a common MAC PDU when a broadcast control message is transmitted.

Referring to FIG. 5, the MAC PDU may process the connection payload information of a connection. The MAC CPS forms the MAC PDUs. The format of a common MAC PDU for the transmission of a broadcast MAC control message may be formed like the MAC PDU 501 of FIG. 5.

The MAC PDU 501 includes a GMH 502, an extended header (EH) 503, and a payload 504. The payload consists of payloads from at least one connection. Each of the connection payloads consists of at least one MAC SDU or MAC SDU fragment received from a CS layer for a corresponding connection.

When a broadcast MAC control message is transmitted, the format of the GMH may be formed like the GMH 502 of FIG. 5. The GMH 502 includes a flow ID for distinguishing connections from each other. In addition, the GMH 502 includes an EH field that represents whether an EH exists in the MAC PDU. In addition, the GMH 502 includes a length field that represents the length of the payload of the MAC PDU. The size of the GMH is fixed.

In addition, when the broadcast MAC control message is transmitted, although not shown in FIG. 5, the format of the EH includes an EH type that represents the type of the EH and an EH body field for a specific content type. The MAC PDU includes a GMH of a fixed size.

In general, a broadcast message informs resource allocation to a burst to which the broadcast message is transmitted by a MAP through a non-user specific A-MAP (or by a broadcast STID performing blind decoding). At this time, when a plurality of broadcast messages are transmitted from one sub frame, since the plurality of broadcast messages are transmitted using the same flow ID, the plurality of broadcast messages cannot be multiplexed and are to be concatenated by one burst to be transmitted.

A control message may be transmitted as a broadcast message, a multicast message, or a unicast message. The types of all of the control messages are defined by the first fields of the messages. Therefore, the terminal may know which kind of broadcast message is transmitted after payload is decoded.

That is, it is possible to check which type of message is transmitted from the base station through the first field of the payload of the MAC PDU.

Therefore, when there exists the MAC PDU transmitted to the STID that represents the broadcast message, all of the broadcast messages transmitted from a corresponding sub frame are decoded.

However, since all of the broadcast messages are transmitted to the same flow ID in a resource region known through the non-user specific MAP (or the broadcast STID) and the broadcast message may detect that the MAC PDU transmitted to corresponding resource is the broadcast message through the non-user specific MAP, actually, the flow ID transmitted from the GMH of the broadcast message may be a meaningless value.

When a multiple broadcast message is transmitted from one sub frame, the terminal must decode a message that is not necessary to be received since the message is the broadcast message. Therefore, the overhead of the terminal is increased.

Disclosure of the Invention

Therefore, an object of the present invention is to provide a method of a terminal effectively receiving a broadcast message using the header of a MAC PDU when a broadcast control message is transmitted to the MAC PDU and an apparatus therefor.

To achieve these and other advantages and in accordance with the purpose of the present invention, as embodied and broadly described herein, there is provided a method of driving a terminal for receiving a broadcast control message formed of a MAC PDU from a wireless access system. The method includes receiving at least one broadcast control message from a base station in a resource region where a broadcast control message is transmitted, extracting broadcast control message type information that represents the kind of a broadcast control message included in the header of the received broadcast control message, and checking the extracted broadcast control message type information and determining whether payload of the received broadcast message is decoded.

The header including the broadcast control message type information is a generic MAC header, an extended header, or a MAC control extended header.

When the header is the generic MAC header, the flow ID field of the GMH represents the broadcast control message type information.

When the header is the extended header, the extended header is a newly added extended header that informs the type of a broadcast control message transmitted from a base station.

When the header is the MAC control extended header, the broadcast message type information is added to the last field of the MCEH.

The broadcast control message type information represents the kind of a control message transmitted from payload of a broadcast control message.

The broadcast control message type information is classified in accordance with the state of a terminal.

A broadcast control message type field set in the payload of the broadcast control message is omitted.

There is provided a terminal for receiving a broadcast control message formed of a MAC PDU from a wireless access system, including a wireless communication unit for receiving at least one broadcast control message from a base station in a resource region where a broadcast control message is transmitted and a controller for extracting broadcast control message type information that represents the kind of a broadcast control message included in the header of the received broadcast control message, for checking the extracted broadcast control message type information, and for determining whether the payload of the received broadcast message is decoded.

The broadcast control message type information represents the kind of a control message transmitted from the payload of a broadcast control message.

The header including the broadcast control message type information is a generic MAC header, an extended header, or a MAC control extended header.

When the header is the generic MAC header, the flow ID field of the GMH represents the broadcast control message type information.

When the header is the extended header, the extended header is a newly added extended header that informs the type of a broadcast control message transmitted from a base station.

When the header is the MAC control extended header, the broadcast message type information is added to the last field of the MCEH.

The broadcast control message type information is classified in accordance with the state of the terminal.

In the present specification, the broadcast control message type is included in the header of the MAC PDU to be transmitted so that the terminal may previously know the kind of the broadcast control message transmitted from the base station to reduce overhead of unnecessarily decoding the payloads of all of the broadcast control messages.

MODES FOR CARRYING OUT THE PREFERRED EMBODIMENTS

Figure 1:
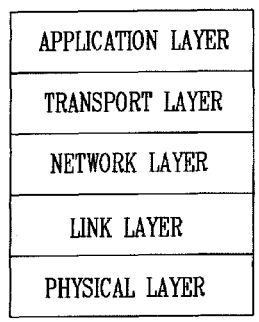
FIG. 1 is a view illustrating an example of a commonly used Internet protocol stack.
Figure 2:
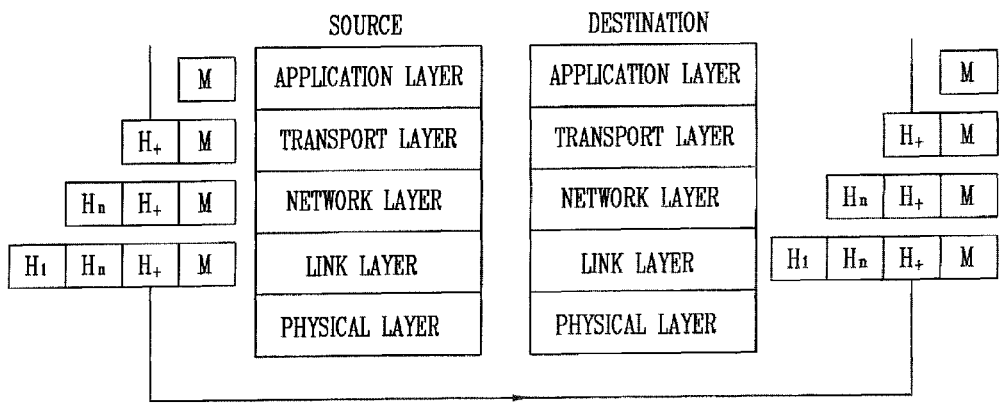
FIG. 2 is a view illustrating the operations of the respective layers for transmitting commonly used data.
Figure 3:
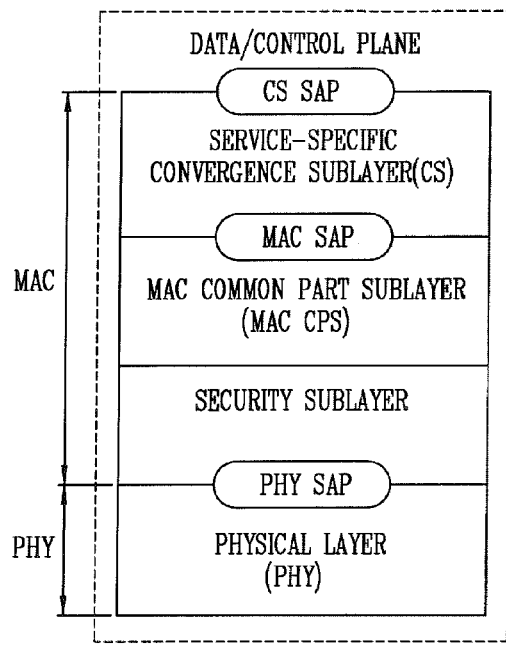
FIG. 3 is a view illustrating a protocol layer model defined by a wireless mobile communication system based on the commonly used IEEE 802.16.
Figure 4:
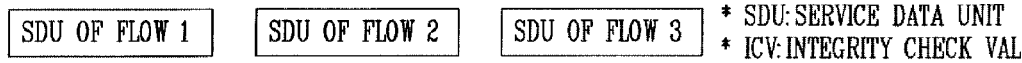
FIG. 4 is a view illustrating processes of a common wireless access system generating MAC PDUs for a plurality of MAC SDUs.
Figure 4:
Figure 4:
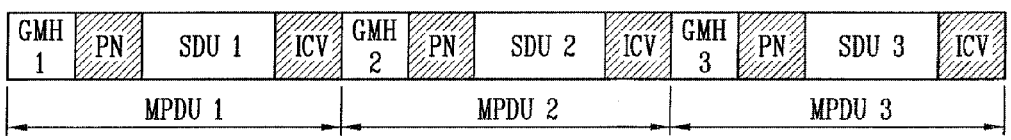
Figure 5:
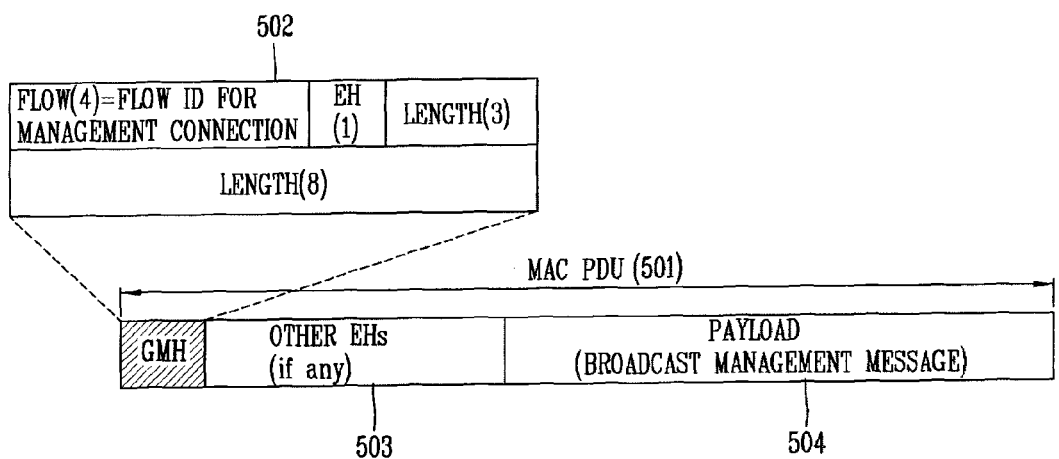
FIG. 5 is a view illustrating the format of a common MAC PDU when a broadcast control message is transmitted.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

In the present specification, there are provided an apparatus for providing an emergency service in a communication system, for example, in a communication system that uses the institute of electrical and electronics engineers (IEEE) 802.16 standard (hereinafter, referred to as the IEEE 802.16 communication system) and a method therefor.

In the present specification, an apparatus for providing an emergency service and a method therefor are described taking the IEEE 802.16 communication system as an example. However, the apparatus for providing the emergency service and the method therefor that are suggested by the present specification may be applied to other communication systems as well as the IEEE 802.16 communication system.

In the following embodiments, the elements and the characteristics of the present specification are combined with each other in a predetermined form. The elements or the characteristics must be considered as being selective. The elements or the characteristics may be performed not to be combined with other elements or characteristics. In addition, it is possible to form the embodiments of the present specification by combining partial elements and/or characteristics. The order of the operations described in the embodiments of the present specification may be changed. Partial elements or characteristics of an embodiment may be included in other embodiments or may be exchanged into the corresponding elements or characteristics of the other embodiments.

The embodiments in the present specification are described based on data transmission and reception relationship between a base station and a terminal. Here, the base station has a meaning as the terminal node of a network that directly performs communications with the terminal. In the present specification, the specific operation described as being performed by the base station may be performed by the upper node of the base station in some cases.

That is, it is apparent that, in the network formed of a plurality of network nodes including the base station, various operations performed for communications with the terminal may be performed by the base station or network nodes other than the base station. The base station may be replaced by a fixed station, a node B, an eNode B (eNB), and an access point. In addition, the terminal may be replaced by user equipment (UE), a mobile station (MS), and a mobile subscriber station (MSS).

The embodiments of the present specification may be realized by various means. For example, the embodiments of the present specification may be realized by hardware, firmware, software, or combinations of the above.

When the embodiments are realized by the hardware, a method according to the embodiments of the present specification may be realized by one or more application specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

When the embodiments are realized by the firmware or the software, the method according to the embodiments of the present specification may be realized by modules, processes, or functions for performing the above-described functions or operations. Software codes may be stored in a memory unit to be driven by a processor. The memory unit is positioned in or outside the processor to transmit data to and receive data from the processor by the published various means.

Specific terms used hereinafter are provided for better understanding of the present specification. The specific terms may be changed into other forms without departing from the spirit and scope of the present specification.

Hereinafter, in the present specification, a method of previously knowing the type of a broadcast message through a header before a terminal decodes the payload of the broadcast message formed of a MAC PDU will be described in detail.

Figure 6:
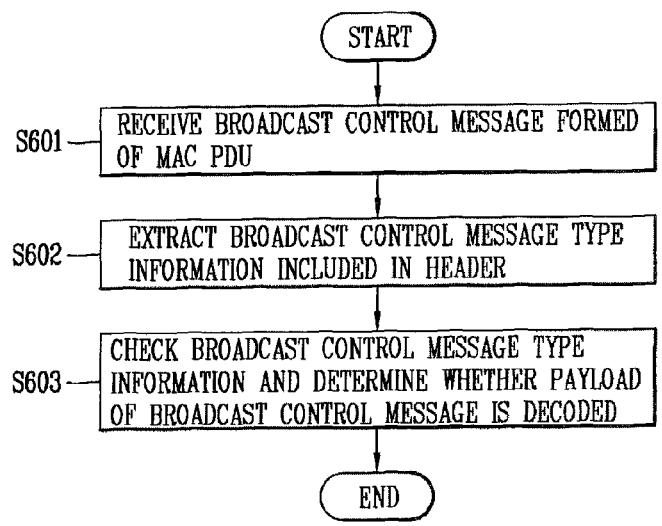
FIG. 6 is a flowchart illustrating processes of a terminal receiving the broadcast control message using broadcast control message type information according to an embodiment of the present specification.

FIG. 6 is a flowchart illustrating processes of a terminal receiving a broadcast control message using broadcast control message type information included in the header of a broadcast control message according to an embodiment of the present specification.

First, the terminal receives at least one broadcast message from the base station in a resource region where the broadcast message is transmitted (S601). The broadcast message is transmitted to the same flow ID in a resource region known through a non-user specific MAP (or broadcast STID).

In addition, the broadcast message received from the base station as a control message consists of the MAC PDU to which a GMH is added. That is, the MAC PDU consists of GMH, EH, and payload.

Here, the MAC PDU may be transmitted with at least one broadcast control message included.

Then, the terminal extracts the broadcast message type information that represents the kind of the broadcast message included in the header of the received broadcast message (S602).

Here, the broadcast message type information represents the kind of the broadcast message transmitted from the payload of the MAC PDU.

In addition, the header of the MAC PDU in which the broadcast message type information is included may be a generic MAC header, an extended header, or a MAC control extended header.

Then, the terminal checks the extracted broadcast message type information and determines whether the payload of the received broadcast message is decoded (S603).

That is, the terminal decodes the header of the broadcast message transmitted from the base station to previously know the kind of the broadcast message. Therefore, the terminal does not entirely decode the payload of the broadcast control message transmitted from the base station but may selectively decode the payload of the broadcast control message.

Hereinafter, the case in which the broadcast control message type information is transmitted while being included in the various headers GMH, EXM, and MCEH of the MAC PDU will be described.

Redefinition of the Flow ID Field of GMH (Used as a Broadcast Control Message Type Field)

Figure 7:
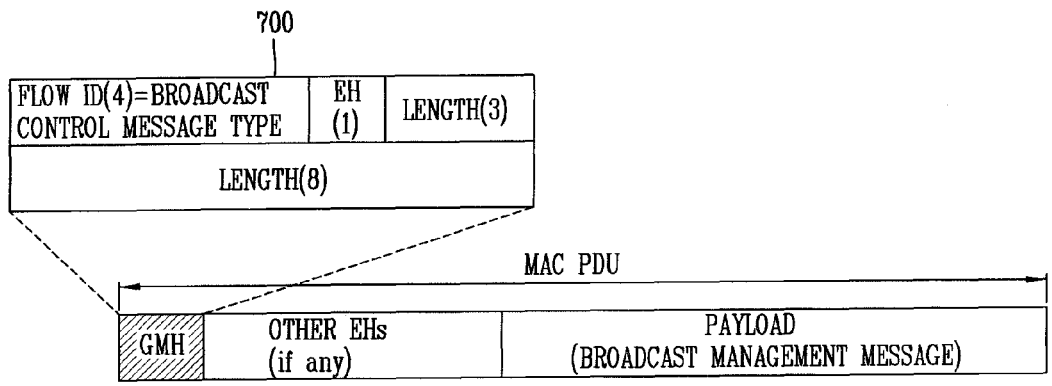
FIG. 7 is a view illustrating an example of a MAC PDU format that redefines a broadcast control message type field in the flow ID field of the GMH of a MAC PDU according to the embodiment of the present specification.

FIG. 7 is a view illustrating an example of an MAC PDU format that redefines a broadcast control message type field in the flow ID of the GMH 700 of the MAC PDU according to an embodiment of the present specification.

As illustrated in FIG. 7, the flow ID field transmitted from the GMH 700 of the broadcast control message (MAC PDU) transmitted through the allocation of resource indicated to the non-user specific MAP or the broadcast STID is newly defined as a field that represents the type of the broadcast control message.

When the terminal may previously know the transmission of the broadcast message through a non-user specific MAP (NUS MAP), the flow ID defined by the conventional GMH may be a meaningless value (all of the broadcast messages are to be transmitted through the same flow ID value ('0000')). That is, the FID is set to vary with the broadcast control message type so that the terminal may previously know the kind of the broadcast control message transmitted from the base station by checking the FID.

In addition, when the FID is redefined as the broadcast message type information to be used, a plurality of broadcast control messages may be transmitted through a multiplexing extended header (MEH).

The flow ID used by the MEH of the MAC PDU transmitted through the MAP that represents the transmission of the broadcast message represents the broadcast message type information transmitted from the base station.

Figure 8:
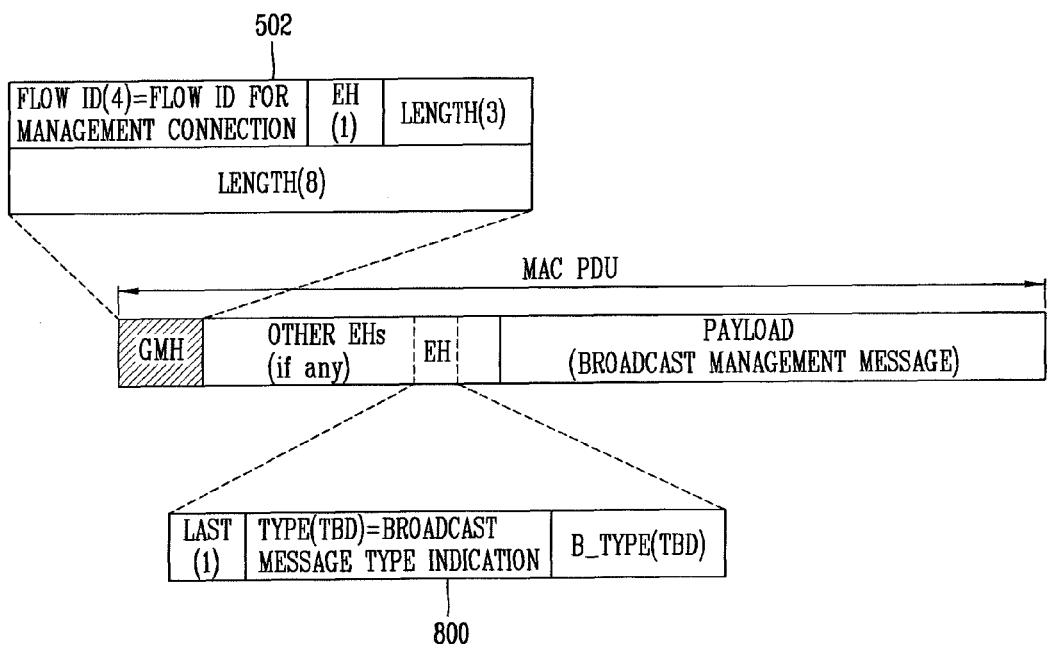
FIG. 8 is a view illustrating an example of a MAC PDU (a broadcast message) to which an extended header is newly added in order to inform a broadcast message type according to the embodiment of the present specification.

Definition of Broadcast Control Message Type Indication EH that Represents the Type of the Broadcast Message FIG. 8 is a view illustrating an example of the MAC PDU (the broadcast message) to which an extended header is newly added in order to inform the broadcast message type according to an embodiment of the present specification.

As illustrated in FIG. 8, a new EH 800 for representing the broadcast message type is defined to inform which kind of broadcast message is transmitted by payload through a B_type field.

Definition of Broadcast Control Message Type Field in MCEH

Figure 9:
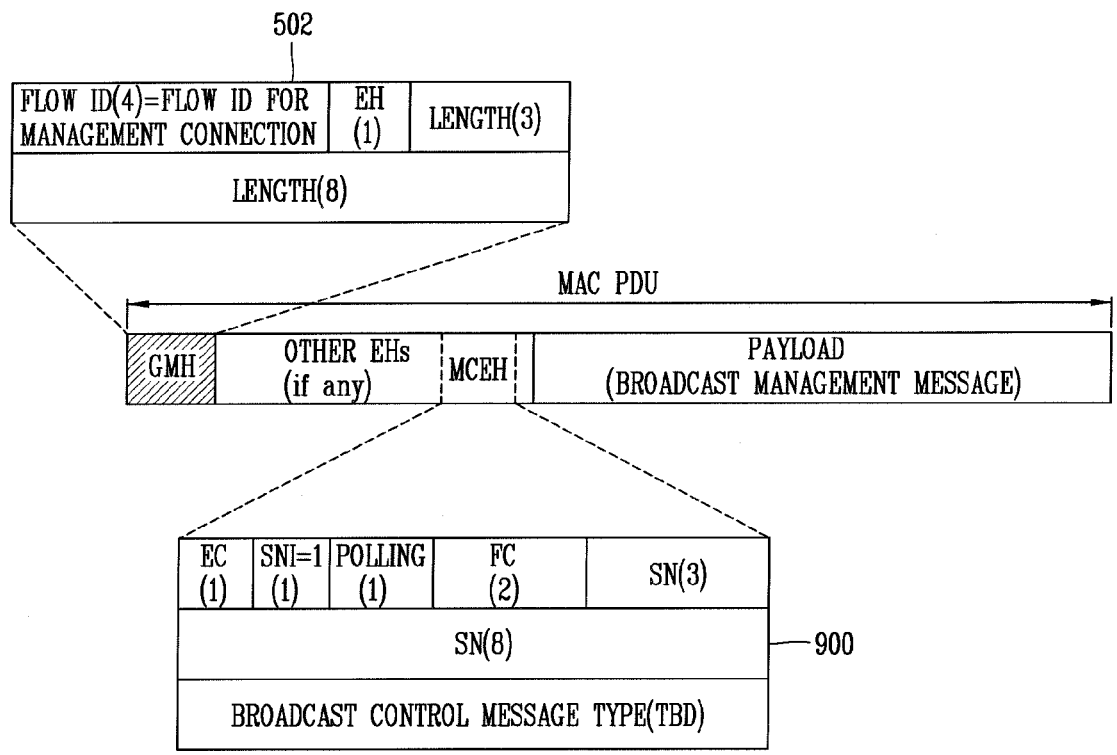
FIG. 9 is a view illustrating an example of a MAC PDU (a broadcast message) that adds a field that represents the broadcast message type information to a MCEH according to the embodiment of the present specification.

FIG. 9 is a view illustrating an example of the MAC PDU (the broadcast message) to which the field that represents the broadcast message type information is added to a MCEH 900 according to an embodiment of the present specification.

As illustrated in FIG. 9, the MCEH 900 of the message transmitted through the non-user specific MAP adds the broadcast control message type as a last field so that the broadcast message transmitted by the payload is what kind of message.

Hereinafter, when the broadcast message type information is transmitted while being included in the headers GMH, EH, and MCEH, an example of defining the broadcast message type will be described.

When the message transmitted from the base station is the broadcast control message (transmitted to the broadcast STID through a blind decoding or non-user specific MAP), the flow ID fields of the respective broadcast messages are defined instead of control message type fields.

TABLE 1 represents an example of mapping between the broadcast message types and the flow IDs according to the present specification.

In addition, the broadcast message type defined in TABLE 1 corresponds to an embodiment and may be differently defined. In addition, the broadcast message type defined in TABLE 1 may be also applied to the header of the MAC PDU illustrated in FIGS. 8 and 9

TABLE 1

| Flow ID (or broadcast control message type field) | Broadcast message name | Broadcast message description |
|---|---|---|
| 0b0000 | AAI_SCD | System configuration descriptor |
| 0b0001 | AAI_SII-ADV | Service Identity Information Advertisement |
| 0b0010 | AAI_RNG-ACK | Aggregated CDMA ranging Acknowledge |
| 0b0011 | AAI_TRF-IND | Traffic Indication |
| 0b0100 | AAI_NBR-ADV | Neighbor Advertisement |
| 0b0101 | AAI_PAG-ADV | BS Paging Advertisement |
| 0b0110 | AAI_UL_Power_Control | UL power control |
| 0b0111 | AAI_MC-ADV | Mullticarrier Advertisement |
| 0b1000 | PGID_info | Paging group Advertisement |
| 0b1001-0b1111 | Reserved | |

As illustrated in TABLE 1, when all of the broadcast message types are newly defined by an arbitrary field (e.g., the flow ID or the broadcast control message type) in a header and are transmitted, an eight bits type field transmitted to the first field of the broadcast control message transmitted to the payload of the MAC PDU may be omitted.

In addition, as illustrated in TABLE 1, the broadcast control message types are not one to one mapped to the respective FIDs but the broadcast control messages may be classified by the types of the broadcast messages in accordance with the characteristics of the terminal.

That is, instead the flow IDs indicate the respective broadcast message types, the broadcast messages having similar characteristics are bound to define by the types of the broadcast messages.

In this case, the broadcast messages transmitted from the base station may be selectively received in accordance with the state (for example, in an idle mode and a sleep mode) of the terminal.

For example, since the AAI_TRF-IND message is effective only to the sleep mode terminal, however, is transmitted to the current broadcast message, an active mode terminal or an idle mode terminal that does not need to receive the message may know that the message is the broadcast message that is not necessary thereto after decoding all of the payloads when the message is transmitted from a sub frame.

Therefore, when the broadcast message type is defined in accordance with the characteristics of the terminal, the terminal has only to decode only the payload of the broadcast message corresponding to the current state of the terminal.

A message such as AAI_PAG-ADV and PGID_info is effective only to the idle mode terminal and the idle mode terminal needs to receive all of the messages related to paging.

Therefore, when the kind of the broadcast message to be received varies with the characteristics of the terminal, after newly binding the types of the broadcast messages to define the broadcast messages, the broadcast messages are included in the above-described MAC PDU (the broadcast message) header to be transmitted so that decoding overhead for the payload of the MAC PDU may be reduced.

Following TABLE 2 represents an example in which the broadcast control message types according to the present specification are classified in accordance with the characteristics of the terminal.

TABLE 2

| Type | Terminal characteristic | Broadcast message name |
|---|---|---|
| 0 | All AMSs | AAI_SCD |
|  |  | AAI_SII-ADV |
|  |  | AAI_NBR-ADV |
|  |  | AAI_UL_Power_Control |
|  |  | AAI_MC-ADV |
| 1 | CDMA based ranging AMS | AAI_RNG-ACK |
| 2 | Sleep mode AMS | AAI_TRF-IND |
| 3 | Idle mode AMS | AAI_PAG-ADV |
|  |  | PGID_info |
| 4-n | reserved | reserved |

The broadcast control message type classified as illustrated in TABLE 2 may be used as the reference of an arbitrary field value for classifying the STID or the broadcast message type in the A-MAP.

That is, a STID for a specific object or a broadcast message type field is defined by the type fields defined in TABLE 2 for a MAP to check the type of a broadcast control message.

Figure 10:
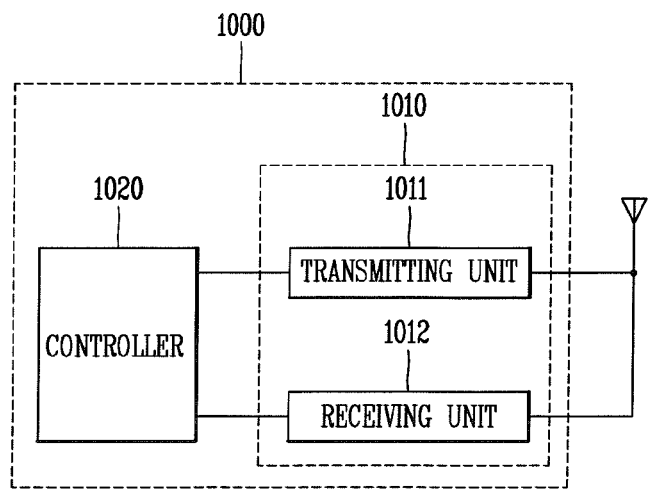
FIG. 10 is a block diagram illustrating the inside of the terminal according to the embodiment of the present specification.

FIG. 10 is an internal block diagram of a terminal 1000 according to an embodiment of the present specification.

The terminal includes a wireless communication unit 1010 including a transmitting unit 1011 and a receiving unit 1012 and a controller 1020.

The wireless communication unit 1010 receives at least one broadcast control message from the base station in a resource region where the broadcast control message is transmitted. The wireless communication unit consists of the transmitting unit 1011 and the receiving unit 1012.

The controller 1020 extracts broadcast control message type information that represents the kind of the broadcast control message included in the header of the received broadcast control message, checks the extracted broadcast control message type information, and determines whether the payload of the received broadcast message is decoded.

In addition, the broadcast control message type information represents the kind of the control message transmitted from the payload of the broadcast control message.

In addition, the header that includes the broadcast control message type information may be a generic MAC header, an extended header, or a MAC control extended header.

The invention claimed is:

1. A method for receiving a broadcast control message in a wireless access system, the method performed by a terminal and comprising:
   receiving a MAC (Medium Access Control) PDU (Protocol Data Unit) including a header and a payload;
   when the terminal previously knows the transmission of the broadcast control message and when the header includes a GMH (generic MAC header),
   extracting a FID (flow identifier) from the header,
   wherein the FID is redefined as broadcast control message type information instead of management connection information when the terminal previously knows the transmission of the broadcast control message and when the header includes the GMH; when the header includes a MCEH (MAC Control Extended Header),
   extracting the broadcast control message type information from the MCEH,
   wherein the header includes the FID, and
   wherein the FID is defined as the management connection information when the header includes the MCEH; and
   selectively decoding the payload of the MAC PDU based on the broadcast control message type indicator and a state of the terminal.

2. The method as claimed in claim 1, wherein the header is a generic MAC header (GMH), an extended header, or a MAC control extended header (MCEH).

3. The method as claimed in claim 2, wherein, when the header is the extended header, the extended header is a newly added extended header that informs the type of a broadcast control message transmitted from a base station.

4. The method as claimed in claim 2, wherein, when the header is the MCEH, the broadcast message type information is added to a last field of the MCEH.

5. The method as claimed in claim 1, wherein a broadcast control message type field set in the payload of the MAC PDU is omitted.

6. A terminal for receiving a broadcast control message in a wireless access system, the terminal comprising:
   a receiver for receiving a MAC (Medium Access Control) PDU (Protocol Data Unit) including a header and a payload; and a controller configured to:
> when the terminal previously knows the transmission of the broadcast control message and when the header includes a GMH (generic MAC header),
>> extracting a FID (flow identifier) from the header,
>> wherein the FID is redefined as broadcast control message type information instead of management connection information when the terminal previously knows the transmission of the broadcast control message and when the header includes the GMH;
>
> when the header includes a MCEH (MAC Control Extended Header),
>> extract the broadcast control message type information from a MCEH (MAC Control Extended Header) of the header,
>> wherein the header includes the FID, and
>> wherein the FID is defined as the management connection information
>
> when the header includes the MCEH, and
> selectively decode the payload of the MAC PDU based on the broadcast control message type indicator and a state of the terminal.

7. The terminal of claim 6, wherein the header is a generic MAC header (GMH), an extended header, or a MAC control extended header (MCEH).

8. The terminal of claim 7, wherein, when the header is the extended header, the extended header is a newly added extended header that informs the type of a broadcast control message transmitted from a base station.

9. The terminal of claim 7, wherein, when the header is the MCEH, the broadcast message type information is added to a last field of the MCEH.

* * * * *